US006951197B2

(12) United States Patent
Wagner et al.

(10) Patent No.: US 6,951,197 B2
(45) Date of Patent: Oct. 4, 2005

(54) METHOD FOR OPERATING AN INTERNAL COMBUSTION ENGINE ESPECIALLY FOR MOTOR VEHICLES

(75) Inventors: Jens Wagner, Stuttgart (DE); Thomas Wenzler, Heimsheim (DE)

(73) Assignee: Robert Bosch GmbH, Stuttgart (DE)

(*) Notice: Subject to any disclaimer, the term of this patent is extended or adjusted under 35 U.S.C. 154(b) by 0 days.

(21) Appl. No.: 10/468,523

(22) PCT Filed: Nov. 20, 2002

(86) PCT No.: PCT/DE02/04264

§ 371 (c)(1),
(2), (4) Date: Jan. 26, 2004

(87) PCT Pub. No.: WO03/052253

PCT Pub. Date: Jun. 26, 2003

(65) Prior Publication Data

US 2004/0123834 A1 Jul. 1, 2004

(30) Foreign Application Priority Data

Dec. 19, 2001 (DE) .......................... 101 63 022

(51) Int. Cl.$^7$ ................................................ F02B 3/12
(52) U.S. Cl. ...................................... 123/295; 123/299
(58) Field of Search ............................. 123/295, 299, 123/300, 305, 443; 701/103–105, 113; 60/274, 284–285

(56) References Cited

U.S. PATENT DOCUMENTS

| 6,561,158 B2 * | 5/2003 | Yoshida et al. .............. 123/295 |
| 2004/0159093 A1 * | 8/2004 | Pott et al. ....................... 60/274 |
| 2004/0163379 A1 * | 8/2004 | Pott et al. ....................... 60/284 |

FOREIGN PATENT DOCUMENTS

| DE | 100 06 609 | 8/2001 |
| DE | 101 00 682 | 7/2002 |
| EP | 1 130 241 | 9/2001 |
| JP | 2001-20780 | * 1/2001 ........... F02D/41/02 |

* cited by examiner

Primary Examiner—Hai Huynh
(74) Attorney, Agent, or Firm—Walter Ottesen

(57) ABSTRACT

The invention relates to a method for operating an internal combustion engine, especially for motor vehicles, the engine having a catalytic converter; in the method, for heating up the catalytic converter, there is a switchover between a homogeneous operating mode with a one-time injection of fuel into a combustion chamber of the engine and an operating mode with subdivided injection of fuel at at least two injection time points into the combustion chamber of the engine; wherein, for subdivided injections, both injection time points lie ahead of an ignition of an air/fuel mixture, the first injection time point essentially corresponds to the injection time point of the homogeneous operating mode during the switchover operation from the homogeneous operating mode to the operating mode with subdivided injection, and the second injection time point of the subdivided injection takes place at first so early that the mixture arising during operation with subdivided injection corresponds approximately to a homogeneous mixture and, after the completed switchover, the second injection time point is shifted toward late until a pregiven mixture preparation is present and, for a switchover from the operating mode with the subdivided injection to the homogeneous operating mode, the shift of the second injection time point takes place in the opposite direction. Furthermore, the invention relates to a computer program which is suitable to carry out the method when the method is carried out on a computer.

11 Claims, 2 Drawing Sheets

METHOD FOR OPERATING AN INTERNAL COMBUSTION ENGINE ESPECIALLY FOR MOTOR VEHICLES

RELATED APPLICATION

This application is the national stage of PCT/DE 02/04264, filed Nov. 20, 2002, designating the United States.

FIELD OF THE INVENTION

The invention relates to a method for operating an internal combustion engine, especially for motor vehicles. In the method, it is provided for heating a catalytic converter that there is a switchover between a homogeneous operating mode with a one-time injection and an operating mode with a subdivided injection of fuel at at least two injection time points into a combustion chamber of the internal combustion engine. In the subdivided injection, both injection points lie forward of an ignition of an air/fuel mixture.

BACKGROUND OF THE INVENTION

A method of this kind is known, for example, from U.S. patent application publication U.S. 2004/0055561 A1 wherein a method is described for heating a catalytic converter in internal combustion engines having gasoline-direct injection with the steps:

shifting the ignition to "retard";

checking whether the charge of the cylinders with air exceeds a pregiven threshold;

subdividing the fuel injection into two component quantities which are injected before the ignition when the air charge exceeds the threshold.

Vehicles having internal combustion engines require catalytic converters in the exhaust-gas system for exhaust-gas purification. These catalytic converters must be brought to the operating temperature as fast as possible after a cold start so that means for heating are provided. For example, after a cold start, the catalytic converter can be heated via high exhaust-gas temperatures. This so-called motoric catalytic converter heating has the advantage that it can be done without additional components.

In internal combustion engines, the exhaust-gas temperature can, in principle, be increased in that the degree of efficiency of combustion is deteriorated. A deterioration of the degree of efficiency of the motoric combustion can, for example, be brought about by a deviation of the ignition time point from the optimal time point. The optimal time point is defined by the maximum degree of efficiency. With a reduction of the degree of efficiency, the exhaust gas is hotter compared to the operation without a deterioration in the degree of efficiency. Accordingly, the exhaust gas develops an intensified heating action in the catalytic converter.

For engines having gasoline-direct injection, there exist, in principle, two possibilities to increase the exhaust-gas temperature without adding additional components:

1. Retarded ignition to deteriorate the degree of efficiency of combustion. The ignited mixture is stoichiometric or slightly lean.
2. Additional injection of fuel after ignition for follow-on combustion. The ignited mixture is very lean (stratified operation).

With the increasing rough running, the retarded ignition is limited for a homogeneous mixture. The emissions can furthermore be improved by a slightly lean exhaust-gas lambda at low catalytic converter temperatures. A leaning is, however, only possible to a limited extent for a cold engine.

If a secondary injection is provided for the catalytic converter heating, then the complete combustion of the additional fuel mass has to be ensured. In order to ensure a reliable and complete combustion in the exhaust manifold, the latter must be optimized in its configuration with respect to through mixing and low thermal mass. Other targets, such as the reduction of structural space and the optimization of power can thereby be limited. In principle, the after-reaction takes place to a poorer degree in a cold exhaust manifold. Accordingly, the emissions can hardly be reduced shortly after the start.

Because higher temperatures are present in the combustion chamber, low emissions can be achieved already shortly after start with an after burning in the combustion chamber. If the fuel is still to be ignited in the combustion chamber, then the operating parameters must be held within a narrow window. Especially, the injection must start very early and therefore contributes significantly to the torque development. Very short injection times are a precondition for small load points which implies very high demands on the injection valves.

The mixture preparation changes with the subdivision or splitting up of the injection in advance of ignition. With this type of mixture, the engine running can be improved. Basically, for a poorer degree of efficiency and therefore a retarded ignition time point and a higher exhaust-gas temperature, an improved rough running is achievable and the mixture can be more greatly leaned earlier after the start than for a homogeneous mixture by simple injection. In this way, lower emissions arise.

However, the accuracy of injection valves at small quantities is very poor. For this reason, a subdividing of the injection for smaller air charges is not possible.

In order to ensure a reliable start and run-up of the engine, that is, of the internal combustion engine, a simple homogeneous injection can still be necessary for this phase. A subdivision of the injection takes place only when there is a sufficient air charge. In this way, short injection times are avoided which would lead to an imprecise fuel metering.

Because of the subdivision of the injection, a mixture stratification arises. In this way, a rather rich mixture can be present at the spark plug while the lambda sum is still lean. A reliable ignition even for a lean lambda sum is ensured by the rich mixture about the spark plug.

Notwithstanding late ignition, a reliable rapid ignition of the mixture can additionally be ensured whereby the quiet running with late ignition is improved.

A different mixture distribution adjusts with divided injection taking place in advance of ignition, namely, rich in the center of the combustion chamber and lean on the wall of the combustion chamber. For this reason, the wall heat loss can be reduced. Depending upon the combustion chamber form and the parameters, the following effects can result:

(i) a higher exhaust-gas temperature with the same exhaust-gas quantity and therefore more heating power for the catalytic converter;
(ii) a low exhaust-gas quantity at the same temperature because the wall heat losses are lower whereby the dwell times of the toxic substance components in the exhaust manifold and in the catalytic converter become longer and an after-reaction is required. The emissions after the catalytic converter can therefore also be improved hereby.

Basically, at least once in the start phase, there must be a switchover from the simple homogeneous injection (start and run-up) to the divided injection (heat up of the catalytic converter) and back. Since the ratio for the injection quantity cannot be varied or can be varied only slightly, there must be a hard switchover between these two types of mixtures.

Here, it can happen that the driver perceives the switchover, which can include an abrupt change in torque, as a jolt in the motor vehicle. The torque development is very different for simple homogeneous injection and subdivided injection because of different mixture types and the different combustion speeds. For this reason, the ignition time point must be abruptly shifted with the switchover and the air charge must be rapidly changed. Even when the torque development for this change is precisely modulated, inaccuracies result because of tolerances of sensors and actuators, for example, via the imprecise detection of the air charge and the crankshaft angle.

Furthermore, inaccuracies of the fuel injection are also present because two short injection times compared to one long injection time are given. In this way, lambda deviations can additionally occur. This problem can be eliminated only by more accurate injection valves.

SUMMARY OF THE INVENTION

The invention provides a method wherein a jolt-like change of the adjusting parameters and therefore of the torque can be reduced while simultaneously having improved heating of the catalytic converter.

The invention solves this task by a previously described method wherein the first injection time point essentially corresponds to the injection time point of the homogeneous operating mode during the switchover operation from the homogeneous mode to the operating mode with subdivided injection and the second injection time point of the subdivided injection takes place so early that the mixture arising hereby corresponds approximately to a homogeneous mixture and, after the completed switchover, the second injection time point is shifted to retard until a pregiven mixture preparation is present and, for a switchover from the operating mode with the subdivided injection to the homogeneous operating mode, the shift of the second injection time point reverses, that is, takes place in the direction of the first injection time point.

In this way, the mixture preparation can be switched over in such a manner that the torque development of homogeneous and subdivided injection is still similar. In this way, possible inaccuracies no longer lead to a conceivable torque jump. Only after the switchover the subdivided injection is changed continuously until the wanted mixture preparation is achieved.

This shift can take place continuously or step-wise. The individual discrete steps can each be so selected that no torque jump is perceived by the driver.

The optimum here is the continuous displacement.

The task is also solved by a computer program, a control apparatus (open loop and closed loop) as well as an internal combustion engine.

Because the second injection time point lies close to the first injection time point directly after the switchover, the mixture corresponds, shortly after the switchover to an operating mode with subdivided injection, approximately to a homogeneous mixture having individual injection. Since the switchover between simple homogeneous injection and subdivided injection always takes place with a second injection, which lies very early (that is, close to the first injection), the ignition time point and the air charge have to be adapted only minimally directly after the switchover. After the switchover to the subdivided injection, the second injection time point is then shifted to late, that is, to the actual desired value. In this way, an adaptation of the air charge quantity takes place and, in the opposite case, an adaptation of the air charge quantity takes place in advance of the switchback. In this way, as a rule, the air charge quantity is raised for the switchover to an operating mode with subdivided injection. Furthermore, an adaptation of the ignition time point can be necessary.

The invention especially relates to a method wherein, in advance of switchover, a check is made as to whether the air charge quantity in the combustion chamber exceeds a pregiven limit value. This is necessary insofar that the accuracy of the fuel metering is reliably given only starting with certain injection quantities. With the subdivision of the injection, the accuracy of the fuel metering is changed because now two short injection times are present compared to one long injection time. It is necessary that at least mean air charges are present and both fuel quantities must be approximately of the same magnitude. Only when the large air charges are reached, can the first injection quantity be varied compared to the second injection quantity in the subdivided injection.

Furthermore, it can be provided that the shift of the second time point is continuous or takes place in several separate discrete steps. A continuous shift with a continuous shift of the ignition time point as well as of the air quantity is especially preferred.

Furthermore, it can be provided that the ignition time point is shifted in order to change the degree of efficiency after the switchover from the homogeneous operating mode into the operating mode having subdivided injection and/or before the switchback with the displacement of the second injection time point.

Especially for a subdivided injection, a retarded ignition time point is possible whereby a deteriorated degree of efficiency can be achieved which, on the other hand, leads to an improved heating up of the catalytic converter. Notwithstanding the deteriorated degree of efficiency because of the retarded ignition time point, the smooth running is, however, improved in an operation with subdivided injection.

Finally, the invention includes a computer program which is suitable for executing the method described above when it is run on a computer. The computer program can be stored especially on a memory, especially a flash memory.

Furthermore, the invention relates to a control apparatus (open loop and/or closed loop) for operating an internal combustion engine with the control apparatus including a memory on which a computer program as described above is stored. A control apparatus of this kind functions for controlling all operations in the engine, for example, the metering of the particular injection quantities, adjusting the ignition time points, metering of the corresponding air quantities, et cetera.

Finally, the invention also includes an internal combustion engine comprising: a combustion chamber; a fuel injection device via which fuel reaches the combustion chamber; a control apparatus (open loop and/or closed loop); a catalytic converter wherein, for heating up the catalytic converter, a switchover is provided between a homogeneous operating mode with a one-time injection and an operating state with subdivided injection of fuel at at least two injection time points into a combustion chamber of the internal combustion engine; for the subdivided injection, both injection time points lie ahead of an ignition of the air/fuel mixture; directly after the switchover operation from the homogeneous operating mode to the operating mode with subdivided injection, the first injection time point corresponds essentially to the first injection time point of the homogeneous operating state and the second injection time point of the subdivided injection at first is so close to the first injection time point that the arising mixture corresponds approximately to a homogeneous mixture and the second injection time point then can be displaced toward retard away from the first injection time point until a pregiven mixture preparation is present; and, the second injection time point is displaceable in the opposite direction for a switchover from the operating state with subdivided injection to the homogeneous operating state.

In total, with the subdivision of the injection, the following advantages are achieved because here another type of mixture is present:

the motor running is improved;

a deteriorated degree of efficiency is possible for an improved smooth running (retarded ignition time point); and, the mixture can be more greatly leaned.

At the same time, abrupt changes of the adjusting parameters can be avoided by the described switchover strategy. The mixture preparation is switched over in such a manner that the torque developments of homogeneous injection and subdivided injection are so similar that inaccuracies (for example, because of tolerances of sensors and actuators) no longer lead to a perceivable abrupt change in torque. Furthermore, no torque losses with switchover are perceivable which the driver perceives in the form of a jolt.

Further features, application possibilities and advantages of the invention become apparent from the description of an embodiment of the invention which follows and which is shown in the figure of the drawing.

BRIEF DESCRIPTION OF THE DRAWINGS

The invention will now be explained with reference to the drawings wherein.

DESCRIPTION OF THE PREFERRED EMBODIMENTS OF THE INVENTION

Figure 1:
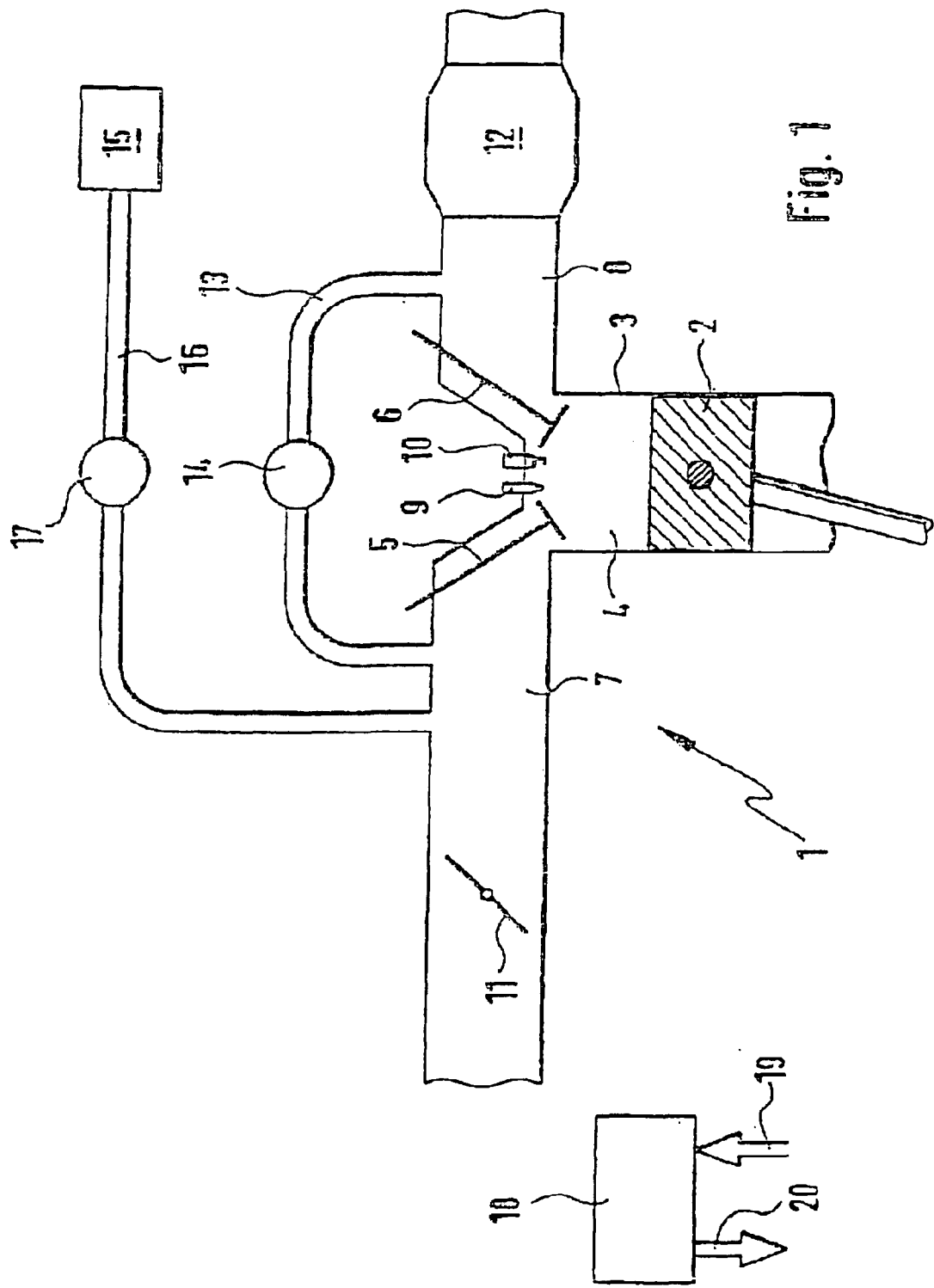
FIG. 1 shows an internal combustion engine.

FIG. 1 shows an internal combustion engine 1 of a motor vehicle wherein a piston 2 is movable back and forth in a cylinder 3. The cylinder 3 is provided with a combustion chamber 4 which, inter alia, is delimited by the piston 2, an inlet valve 5 and an outlet valve 6. An intake manifold 7 is coupled to the inlet valve 5 and an exhaust-gas pipe 8 is coupled to the outlet valve 6. An injection valve 9 and a spark plug 10 project into the combustion chamber in the region of the inlet valve 5 and the outlet valve 6. Fuel can be injected into the combustion chamber 4 via the injection valve 9. The fuel in the combustion chamber 4 can be ignited by the spark plug 10.

A rotatable throttle flap 11 is accommodated in the intake manifold 7 via which air is supplied to the intake manifold 7. The quantity of the supplied air is dependent upon the angular position of the throttle flap 11. A catalytic converter 12 is accommodated in the exhaust-gas pipe 8 and functions to purify the exhaust gases developed by the combustion of the fuel.

An exhaust-gas recirculation pipe 13 leads from the exhaust-gas pipe 8 back to the intake manifold 7. An exhaust-gas recirculation valve 14 is accommodated in the exhaust-gas recirculation pipe 13 with which the quantity of the exhaust gas, which is recirculated into the intake manifold 7, can be adjusted.

A tank-venting line 16 leads from a fuel tank 15 to the intake manifold 7. A tank-venting valve 17 is accommodated in the tank-venting line 16. The quantity of fuel vapor supplied to the intake manifold 7 from the fuel tank 15 can be adjusted with the tank-venting valve 17.

A back and forth movement is imparted to the piston 2 by the combustion of the fuel in the combustion chamber 4. This movement is transmitted to a crankshaft (not shown) and applies a torque thereto.

Input signals 19 are applied to a control apparatus 18 for open loop control and/or closed loop control. The input signals 19 represent operating variables of the internal combustion engine 1 which are measured by sensors. For example, the control apparatus 18 is connected to an air mass sensor, a lambda sensor, an rpm sensor and the like. Furthermore, the control apparatus 18 is connected to an accelerator pedal sensor which generates a signal which indicates the position of an accelerator pedal, which is actuable by a driver, and therefore the requested torque.

The control apparatus 18 generates output signals 20 with which the performance of the internal combustion engine 1 can be influenced via actuators or positioning devices. For example, the control apparatus 18 is connected to the injection valve 9, the spark plug 10 or the throttle flap 11 and the like and generates the signals required to drive the same.

The control apparatus is, inter alia, provided for controlling (open loop and/or closed loop) the operating variables of the internal combustion engine 1. Especially, the fuel mass, which is injected by the injection valve 9 into the combustion chamber 4, is controlled by the control apparatus 18 especially in view to a low fuel consumption and/or a low development of toxic substances. For this purpose, the control apparatus 18 is provided with a microprocessor (computer) which has a program stored in a memory medium (especially in a flash memory) and which program is suitable for carrying out the above-mentioned control (open loop and/or closed loop).

The control apparatus 18 especially determines the throttle flap angle and the injection pulsewidth which define essential actuating quantities for realizing the desired torque, the exhaust-gas composition and the exhaust-gas temperature. The actuating variables are to be matched to each other. A further essential actuating variable for influencing these quantities is the angular position of the ignition relative to the piston movement.

In this context, the catalytic converter temperature can be determined. Here, measurements as well as also a modulating from operating quantities are considered. Especially at the start of the engine, the problem is, however, present that the catalytic converter 12 does not have the adequate operating temperature. It is therefore necessary that the catalytic converter 12 be brought as rapidly as possible to the operating temperature after a cold start. This heat-up can take place with the so-called motoric catalytic converter heating via a high exhaust-gas temperature.

The start of an engine takes place, as a rule, in a first operating mode, the so-called homogeneous operating mode of the engine 1. The throttle flap 11 is partially opened or closed in dependence upon the desired torque. The fuel is injected into the combustion chamber 4 by the injection valve 9 during an induction phase caused by the piston 2. With the air, which is inducted simultaneously via the throttle flap 11, the injected fuel is swirled and therewith is essentially uniformly distributed in the combustion chamber 4. Thereafter, the air/fuel mixture is compressed during the compression phase in order to be ignited by the spark plug 10. With the expansion of the ignited fuel, the piston 2 is driven. The occurring torque is essentially dependent upon the position of the throttle flap 11 in the homogeneous operation. The throttle flap is essentially closed in the start phase. With a view to a low toxic substance development, the air/fuel mixture is adjusted at lambda=1 or is adjusted slightly lean at lambda>1.

To increase the exhaust-gas temperature, it can be provided to deteriorate the degree of efficiency of the combustion in that the ignition takes place at a later crankshaft angle. The ignited mixture is adjusted to be stoichiometric or slightly lean. However, for a homogeneous operating mode, the disadvantage is present that the smooth running of the engine is not adequate.

According to the invention, the start of the internal combustion engine 1 nonetheless takes place in the homogeneous operating mode because the air quantity during start run-up is not always adequate for a subdivided injection.

As soon as a conclusion can be drawn as to a sufficiently large or at least mean air charge from the position of the throttle flap 11 or other sensor signals, a switchover into an operating mode with subdivided injection is carried out for heating the catalytic converter. Initially, a first injection quantity is injected into the combustion chamber and a second injection quantity is injected at a later crankshaft angle. The two injection time points lie ahead of the ignition time point of the spark plug 10. With the subdivision of the injection, a mixture stratification arises. A rather rich mixture is present at the spark plug 10 even though the lambda sum in the total combustion chamber 4 is still lean. A reliable ignition even for a very lean lambda sum is ensured by the rich mixture about the spark plug. Notwithstanding a retarded ignition, a reliable rapid ignition of the mixture is additionally ensured. In this way, the smooth running increases even for retarded ignition and therewith a deteriorated degree of efficiency. In this way, wall heat losses are reduced and higher exhaust-gas temperatures can be achieved for like exhaust gas quantities. In this way, the heating of the catalytic converter is achieved more rapidly.

With the switchover, the following problems are present: at first, the switchover can only take place when a minimum air charge is present because, otherwise, the fuel quantity per injection, which is to be injected, is too low in order to ensure that the control of the fuel metering has a sufficient accuracy. Furthermore, the torque development is very different for simple homogeneous injection and subdivided injection because of the different mixture types and the different combustion speed. Accordingly, with the switchover, the ignition time point must be shifted abruptly and the air charge must be changed rapidly. Even when the torque development for these changes can be modeled precisely, inaccuracies arise because of tolerances of the sensors and actuators. Accordingly, a torque jump can occur which the driver perceives. Furthermore, lambda deviations can occur because the precision of the fuel metering is different for the two types of injection.

According to the invention, it is therefore suggested that the mixture preparation is reconfigured in such a manner that the torque development of homogeneous injection and subdivided injection is still similar at the time point of the switchover. Here, a perceptible abrupt change in torque no longer occurs because of possible inaccuracies. After the switchover, the subdivided injection is continuously changed, that is, the two injection time points are spread apart in that the second injection time point is shifted to retard until the desired mixture preparation is reached.

Directly after the switchover, the second injection time point is so early that it lies virtually at the first injection time point and therefore the mixture approximately corresponds to the homogeneous mixture with single injection. The ignition time point and the air charge must then only be adapted minimally. After the switchover, the second injection time point can be shifted continuously to the actual desired value, that is, in the direction of the ignition time point. Ignition time point and air charge are then adapted to the changed mixture preparation and torque development. Especially, the air charge is increased in order to counter a torque loss. The ignition time point can be shifted further rearwardly when there is uniform smooth running because a divided injection permits a higher smooth running for a deteriorated degree of efficiency than a homogeneous injection.

In total, the mixture types have similar characteristics at the switchover. Inaccuracies of sensors and actuators therefore do not act differently. Especially when the shift of the second injection time point of the second fuel quantity takes place slowly and continuously, inaccuracies are not perceptible any longer and they do not lead to a reduction in the driving performance of the vehicle.

If the air charge is increased after or during the shift of the second fuel injection to "late", the ignition time point is adapted in correspondence to the higher charge and the changed mixture preparation. Overall, steps and jumps, which result in the maximum torque at optimal ignition, can be brought close to each other in such a manner that the individual operating modes pass approximately continuously one into the other.

Figure 2:
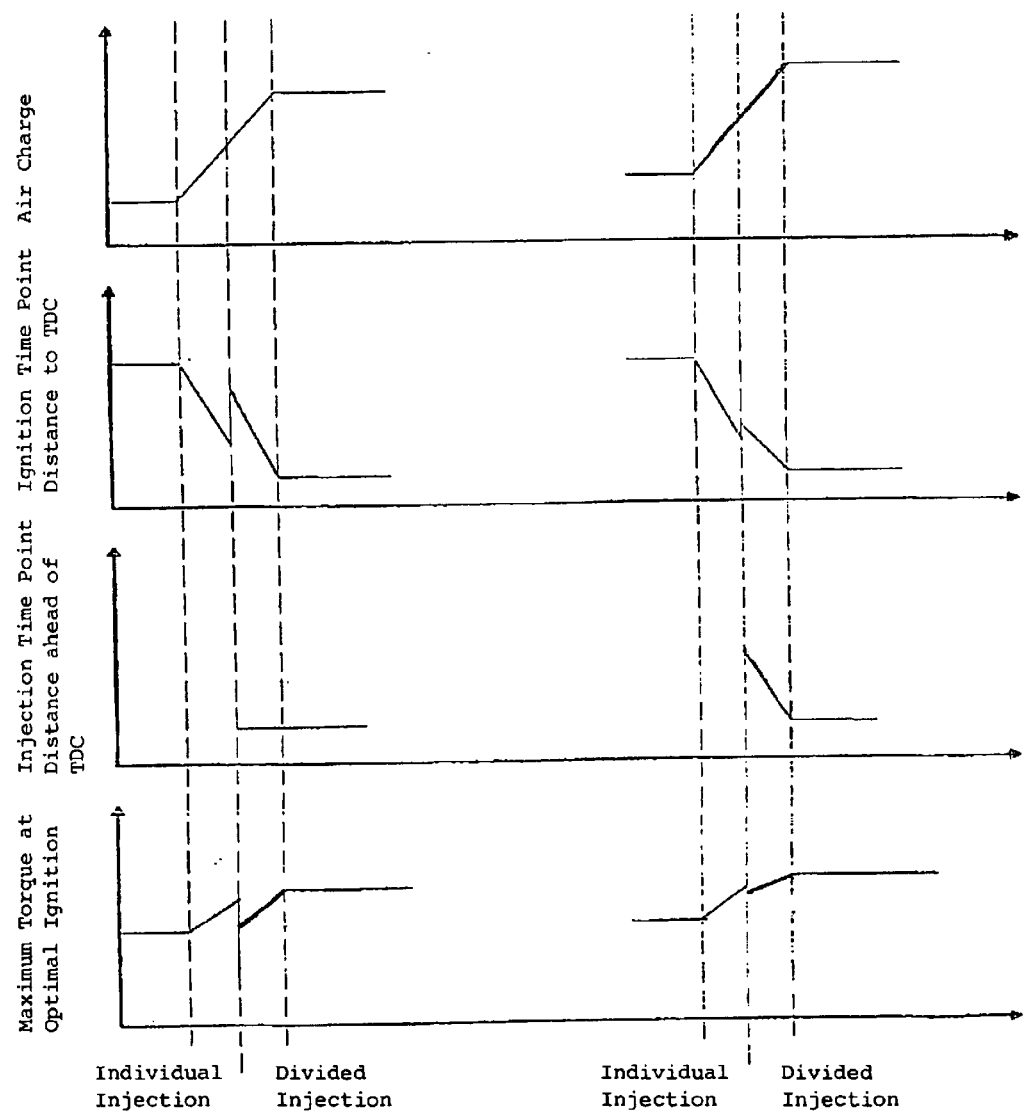
FIG. 2 shows traces of parameters in the switchover with a shift of the second injection time point and for a spontaneous switchover.

FIG. 2 shows in detail how the individual parameters change when the switchover is changed abruptly or by continuous displacement of the second fuel injection with respect to the time point.

FIG. 2 shows, on the left-hand side, the maximum torque for optimal ignition, the ignition time point with respect to the distance ahead of top dead center, the ignition time point with respect to the distance to top dead center and the air charge for a direct switchover to the wanted desired value for the subdivided injection. The right-hand illustrations show, in contrast, a "ramping" in accordance with the invention. The injection time point of the second fuel quantity at first lies close to the first ignition time point and, therefore, the mixture characteristic corresponds closely to that of the homogeneous injection.

It can be especially well seen that in the lowest diagram, which shows the maximum torque at optimal ignition for an individual injection over time, at first a constant torque is present. This torque increases because even at optimal ignition for the subdivided injection, a lower torque is developed than for a simple homogeneous injection and therefore, more air charge must be built up already ahead of the switchover. Therefore, the optimal torque increases for the homogeneous injection with the air charge. This torque then drops abruptly at the time point of the switchover which is shown in each case by the center broken perpendicular line. This power loss is perceived by the driver as a jolt if the power loss is not adequately compensated via the correction of the ignition time point. With the increase of the air quantity as well as the adjustment of an optimal ignition time point, this torque can slowly again be increased.

In a switchover, the second fuel injection is first also early, that is, far forward of the top dead center point and the mixture acts like a homogeneous mixture at first also after the switchover. With the shift of the ignition time point and the second injection time point, the optimal torque, in turn, increases to the end value. A jump is not approximately to be determined via the switchover.

The second diagram from below shows the spacing from bottom dead center with respect to the second injection time point. While it is shown on the left side that this injection time point is at a relatively short distance from top dead center already at the time point of the switchover, it can be seen in the right-hand diagram that this injection time point, at first, shows a considerable distance from top dead center after the switchover and then only is moved during the switchover toward the desired value which lies close to top dead center.

It can likewise be seen that, at first, the ignition time point for a homogeneous injection has a relatively large distance from top dead center, that is, an early ignition takes place because only then is a good smooth running ensured for homogeneous injection. When switchover is approached, this time point is displaced rearwardly in order for the increased air charge, which results from the uppermost diagram, to counter a further increase of the torque for homogeneous operating mode. By shifting the ignition time point rearwardly, the smooth running is, however, deteriorated.

After the switchover, the ignition time point has to be again shifted abruptly to early in order to first counter a drop in torque for uniform air charge and thereby achieve an optimal ignition. At the later time point, the ignition time point can again be shifted rearwardly. A shift can take place overall significantly farther rearwardly, that is, the ignition can take place at a later time point than in a homogeneous mode of operation because here the smooth running is not affected by the deteriorated degree of efficiency.

If one now views the right diagram, it can be seen that here too, the ignition time points only carry out a small jump because, here too, the mixture characteristics are similar at the time point of the switchover.

The air charge is approximately the same for the abrupt switchover as well as for the continuous switchover because this air charge must be increased for an operating mode with divided injection in order to obtain an optimal torque.

What is claimed is:

1. A method for operating an internal combustion engine including an internal combustion engine for a motor vehicle, the engine having a catalytic converter, the method comprising the steps of:

for heating up the catalytic converter, switching over between a homogeneous operating mode with one-time injection of fuel into a combustion chamber of said engine and an operating mode with subdivided injection of fuel at at least two injection time points into said combustion chamber of said engine, wherein, for subdivided injections, both injection time points lie ahead of an ignition of an air/fuel mixture;

causing the first injection time point to essentially correspond to the injection time point of the homogeneous operating mode during the switchover operation from the homogeneous operating mode to the operating mode with subdivided injection;

causing the second injection of the subdivided injection to at first take place so early that the arising mixture corresponds during operation with subdivided injection approximately to a homogeneous mixture;

after the completed switchover, shifting the second injection time point toward late until a pregiven mixture preparation is present; and, for a switchover from the operating mode with the subdivided injection to the homogeneous operating mode, shifting the second injection time point in the opposite direction.

2. The method of claim 1, wherein, in advance of the switchover, a check is made as to whether the air charge quantity in the combustion chamber exceeds a pregiven limit value.

3. The method of claim 1, wherein, after the switchover from homogeneous operating mode into the operating mode with subdivided injection, the air charge quantity is increased when the second injection time point is shifted toward late; and, the adaptation of the air charge quantity in advance of the return switching into the homogeneous operating mode takes place in a correspondingly reversed manner.

4. The method of claim 1, wherein, after the switchover from the homogeneous operating mode into the operating mode having subdivided injection and/or, in advance of switching back, the ignition time point is shifted for the shift of the second injection time point.

5. The method of claim 1, wherein the shift of the second injection time point takes place continuously or in several discrete steps.

6. The method of claim 1, wherein, during the shift of the second injection to late, the injected fuel quantity is reduced in order to achieve an overall lean lambda.

7. The method of claim 6, wherein, with the shift of the second injection to early, the injected fuel quantity is again increased in order to maintain the lean running limit for simple homogeneous injection.

8. A computer program, comprising a program suitable for carrying out a method for operating an internal combustion engine, the method including the following steps when executing the program on a computer:

for heating up the catalytic converter, switching over between a homogeneous operating mode with one-time injection of fuel into a combustion chamber of said engine and an operating mode with subdivided injection of fuel at at least two injection time points into said combustion chamber of said engine, wherein, for subdivided injections, both injection time points lie ahead of an ignition of an air/fuel mixture;

causing the first injection time point to essentially correspond to the injection time point of the homogeneous operating mode during the switchover operation from the homogeneous operating mode to the operating mode with subdivided injection;

causing the second injection of the subdivided injection to at first take place so early that the arising mixture corresponds during operation with subdivided injection approximately to a homogeneous mixture;

after the completed switchover, shifting the second injection time point toward late until a pregiven mixture preparation is present; and, for a switchover from the operating mode with the subdivided injection to the homogeneous operating mode, shifting the second injection time point in the opposite direction.

9. The computer program of claim 8, wherein the computer program is stored in a memory including in a flash memory.

10. A control apparatus (open loop and/or closed loop) for operating an internal combustion engine including an internal combustion engine of a motor vehicle, the control apparatus comprising a memory on which a computer program is stored for carrying out the following method steps:

for heating up the catalytic converter, switching over between a homogeneous operating mode with one-time injection of fuel into a combustion chamber of said engine and an operating mode with subdivided injection of fuel at at least two injection time points into said combustion chamber of said engine, wherein, for subdivided injections, both injection time points lie ahead of an ignition of an air/fuel mixture;

causing the first injection time point to essentially correspond to the injection time point of the homogeneous operating mode during the switchover operation from the homogeneous operating mode to the operating mode with subdivided injection causing the second injection of the subdivided injection to at first take place so early that the arising mixture corresponds during operation with subdivided injection approximately to a homogeneous mixture;

after the completed switchover, shifting the second injection time point toward late until a pregiven mixture preparation is present; and, for a switchover from the operating mode with the subdivided injection to the homogeneous operating mode, shifting the second injection time point in the opposite direction.

11. An internal combustion engine comprising:

a combustion chamber;

a fuel injection device via which fuel reaches the combustion chamber;

a control apparatus (open loop and/or closed loop);

a catalytic converter; and, for heating up the catalytic converter, said control apparatus including means for carrying out the method steps of:

switching over between a homogeneous operating mode with a one-time injection and an operating mode with subdivided injection of fuel at at least two injection time points into the combustion chamber of the internal combustion engine;

for the subdivided injection, causing both injection time points to lie ahead of an ignition of the air/fuel mixture;

directly after the switchover operation from the homogeneous operating mode to the operating mode with subdivided injection, causing the first injection time point to essentially correspond to the injection time point of the homogeneous operating mode and the second injection time point of the subdivided injection at first is so close to the first injection time point that the hereby arising mixture corresponds approximately to a homogeneous mixture and then displacing the second injection time point toward late away from the first injection time point until a pregiven mixture preparation is present; and, displacing the second injection time point in the opposite direction for a switchover from the operating mode with subdivided injection to the homogeneous operating mode.

* * * * *